US009802332B2

(12) United States Patent
Davey

(10) Patent No.: US 9,802,332 B2
(45) Date of Patent: Oct. 31, 2017

(54) ROUTER JIG FOR CUTTING DECORATIVE PROFILES

(71) Applicant: Scribe Master Limited, Dover, Kent (GB)

(72) Inventor: Colin Roy Davey, Dover (GB)

(73) Assignee: SCRIBE MASTER LIMITED, Dover, Kent (GB)

( * ) Notice: Subject to any disclaimer, the term of this patent is extended or adjusted under 35 U.S.C. 154(b) by 763 days.

(21) Appl. No.: 14/282,516

(22) Filed: May 20, 2014

(65) Prior Publication Data

US 2014/0345749 A1 Nov. 27, 2014

(30) Foreign Application Priority Data

May 21, 2013 (GB) .................................. 1309136.8

(51) Int. Cl.
*B27C 5/10* (2006.01)
*B27C 5/00* (2006.01)
*B27F 1/00* (2006.01)
*B23Q 35/42* (2006.01)

(52) U.S. Cl.
CPC .............. *B27C 5/003* (2013.01); *B23Q 35/42* (2013.01); *B27C 5/10* (2013.01); *B27F 1/00* (2013.01)

(58) Field of Classification Search
CPC .... B27C 5/10; B27C 5/02; B27C 5/04; B27C 5/06; B27C 1/14; B23Q 3/183; B23Q 3/18; B23Q 3/186; B23Q 35/04; B23Q 35/08; B23Q 35/24; B23Q 35/26; Y10T 409/303416; Y10T 409/303472; Y10T 409/303696

USPC ............. 144/144.1, 144.51, 145.1; 33/561.1, 33/514.2, 41.5, 628
See application file for complete search history.

(56) References Cited

U.S. PATENT DOCUMENTS

| 1,019,923 | A | * | 3/1912 | Schelter | ................. | G01B 5/207 |
| | | | | | | 33/561.1 |
| 4,743,004 | A | * | 5/1988 | Kloss | ..................... | B23D 51/04 |
| | | | | | | 269/296 |
| 5,667,001 | A | | 9/1997 | Sanger et al. | | |
| 5,893,402 | A | | 4/1999 | Darling | | |

(Continued)

FOREIGN PATENT DOCUMENTS

| DE | 3120727 A1 | 12/1982 | | |
| GB | WO 2008029127 A1 | * | 3/2008 | ........... B23Q 35/102 |
| WO | 2008/029127 A1 | 3/2008 | | |

*Primary Examiner* — Shelley Self
*Assistant Examiner* — Smith O Bapthelus
(74) *Attorney, Agent, or Firm* — Parsons Summa

(57) ABSTRACT

A jig for profiling the end of an elongate workpiece, especially a coping or crown molding section, comprises a support for a sample to be copied, and for a profiling comb to be pushed against the sample to define a cam surface. A cutting tool can be mounted to follow a path defined by the cam surface, to cut the workpiece end to match the shape of the cam surface. The profiling comb is movable between a first position facing the sample support to form a profile and a second position in which the profile can contact the cam follower on the movable mounting. In its second position the comb extends at an acute angle to the longitudinal direction of the workpiece support, which is configured to support the workpiece at an acute angle about its longitudinal axis corresponding to the angle at which the comb is fixed.

7 Claims, 13 Drawing Sheets

(56) References Cited

U.S. PATENT DOCUMENTS 6,450,220 B2  9/2002  Domask
7,913,729 B2  3/2011  Breich

* cited by examiner

ROUTER JIG FOR CUTTING DECORATIVE PROFILES

REFERENCE TO EARLIER APPLICATION

This application claims priority from United Kingdom patent application No. 1309136.8, filed on May 21, 2013, the disclosure of which is incorporated herein by reference.

BACKGROUND OF THE INVENTION

Field of the Invention

This invention relates to a jig for guiding a routing tool or the like for cutting the ends of elongate workpieces, and in particular wooden mouldings, to enable accurate joints to be made.

Description of the Prior Art

Skirting boards, picture rails, dado rails, window frame sections and the like are often made with a decorative cross section. When fixing such features around a room or constructing a frame from such sections, it can be difficult to produce neat and accurate joints at corners, with the two profiled sections mating accurately and without a gap between them. If one attempts to cut a 45° mitre joint, it will often be found that the corner in which the two sections meet is not an exact right angle, particularly in an old building. This can result in a gap between the ends of the mating sections, and it can be difficult to trim either cut end to the correct angle.

Best practice therefore is to cut the end of one profiled section to match the cross section of the other. This can be done with a router or similar tool, but an accurate guide or template is needed to enable such cuts to be made accurately and reproducibly. At present such templates can only be produced by expensive factory-based equipment and there is also a need for a portable and adaptable device that can be set up on site to reproduce any desired section. WO2008/029127, the disclosure of which is incorporated herein by reference, describes a router jig on which is mounted a profiling comb, comprising a set of thin parallel plates, each being individually and reversibly slidable in one direction relative to the others, with means for locking the plates relative to one another, whereby a set of plates can be pushed against a section of the moulding to be matched, each said plate being pushed into abutment with the profile so that the abutting ends of the plates together form a cam surface in the shape of a cross section of the moulding, and can be locked in that configuration, the jig also having a slide or other moveable mounting on which a cutting tool can be mounted to follow a path defined by the cam surface to cut an end of a section to match the profile. The jig illustrated comprises a workpiece support with a tool support comprising a frame or platform supported above it, for example on pillars, the comb being mounted on the tool support together with the cutting tool slide and preferably also clamping means for the section to be cut or for the section whose profile is to be reproduced. The jig described in this document can cut one end of a profiled workpiece so that it can accurately match the cross section of a workpiece with which it is to be mated substantially at right angles, enabling and professional-looking joint to be made.

The present inventor has looked for ways to improve the known type of jig described above, in particular to make it easier to use and also to enable it to profile a wider range of workpieces, notably including crown mouldings used to embellish the joints between walls and ceilings. It has not hitherto been possible to profile such mouldings using a router.

SUMMARY OF THE INVENTION

According to one aspect of the invention there is provided a router jig for profiling the end of an elongate workpiece to match a desired shape, said jig comprising:

a support for a sample having a surface profile to be copied, typically a small section cut from the workpiece;

a profiling comb in the form of an array of parallel plates held in contact with one another by retaining means extending between a pair of support blocks, each said plate being individually and reversibly slidable in one direction relative to the others and having a contact surface at one end thereof whereby the contact surfaces of adjacent plates can be pushed against a sample in said support to define a cam surface corresponding to the profile to be copied, means being provided for locking the plates of the profiling comb against said sliding movement;

a movable mounting on which a cutting tool can be mounted and moved to follow a path defined by said cam surface to cut an end of the workpiece to match the shape of said cam surface, and a workpiece support arranged to hold said workpiece with one end in the path of a cutting tool mounted on said movable mounting, wherein the profiling comb is movable between a first position in which the contact surfaces of the plate face the sample support for the purpose of forming a profile and second position in which a profile formed by said plates can contact a cam follower on said movable mounting, wherein said profiling comb, when in said second position, is fixable at an acute angle to a longitudinal direction of a workpiece in said workpiece support and wherein the workpiece support is configured to support and retain a workpiece at an acute angle corresponding to said angle at which said profiling comb is fixed.

According to another aspect of the present invention there is provided a profiling comb for a router jig comprising a set of parallel plates mounted side by side and a pair of support blocks holding said plates together between them, whereby each said plate is individually and reversibly slidable in one direction relative to the others to enable the set of plates to be pushed against a sample having a shape to be profiled, with the surface of each said plate pushed into abutment with a shaped surface of the sample and the abutting ends of the plates together forming a profiled surface, wherein each of said plates has an elongate slot therein and wherein the support blocks are connected together by at least two rods passing through the slots in the plates, at least one said block being movable towards and away from the other by sliding on said rods and means being provided to tighten said blocks against the plates to lock them against said relative movement and thus retain a profile formed thereby.

In some embodiments each of the rods linking the support blocks has one end fixedly secured to one of the blocks, its other end passing through the other said block and being threadedly connected to a tightening member, whereby turning of the tightening member pushes the two support blocks towards each other. In some embodiments the first said support block has one or more apertures therethrough for mounting on a locating pin of a router jig and the other said support block has at least two said apertures for mounting on respective locating pins, whereby when the comb is mounted on a router jig it is secured by triangulation against any twisting movement thereof.

In some embodiments the or each location aperture on one said support block is elongated in a direction parallel to the rods, so that the comb can be tightened while in position on the router jig.

According to yet another aspect of the invention, there is provided a router jig for profiling the end of the elongate workpiece to match a desired shape, said jig comprising:

a support for a profiling comb and for a sample whose profile is to be copied;

a profiling comb in the form of an array of parallel plates held in contact with one another by retaining means extending between a pair of support blocks, each said plate being individually and reversibly slidable in one direction relative to the others and having a contact surface at one end thereof whereby the contact surfaces of adjacent plates can be pushed against a sample in said support to define a cam surface corresponding to the profile to be copied; and a movable mounting on which a cutting tool can be mounted, the mounting having a cam follower able to engage said cam surface whereby said cutting tool can be moved to follow a path defined by said cam surface to cut an end of the workpiece to match the shape of said cam surface, wherein means are provided for locking the plates of the profiling comb against said sliding movement, wherein the profiling comb is movable between a first position in which the contact surfaces of the plate face the sample support for the purpose of forming a profile and second position in which a profile formed by said plates and contact the cam follower on said movable mounting and wherein in each of said first and second positions one of said side supports of the comb positively engages the jig in at least two positions while the other side support positively engages the jig in at least one position, to give a triangulated lock against twisting movement of the comb.

According to a further aspect of the invention, there is provided a router jig for profiling the end of an elongate workpiece to match a desired shape, said jig comprising:

a support for a sample whose profile is to be copied;

a profiling comb in the form of an array of parallel plates held in contact with one another by retaining means extending between a pair of support blocks, each said plate being individually and reversibly slidable in one direction relative to the others and having a contact surface at one end thereof whereby the contact surfaces of adjacent plates can be pushed against a sample in said support to define a cam surface corresponding to the profile to be copied; and a movable mounting on which a cutting tool can be mounted and moved to follow a path defined by said cam surface to cut an end of the workpiece to match the shape of said cam surface, whereby means are provided for locking the plates of the profiling comb against said sliding movement and wherein the profiling comb is movable between a first position in which the contact surfaces of the plate face the sample support for the purpose of forming a profile and a second position in which a profile formed by said plates can contact a cam follower on said movable mounting and wherein the profiling comb is mounted adjustably on the jig so that in said first position the relative angular positions of the comb and the sample support can be varied through at least 60° and said second position relative to the movable mounting can be varied through at least 45°.

The jig according to this latter aspect of the invention can be used with a router for profiling crown mouldings and cutting the end sections of such a moulding to mate with the profile of another.

The router jigs according to some embodiments of the invention comprise a support base having a flat surface on which a workpiece can be positioned, the support base having an aperture through which a router bit can extend when cutting the workpiece. Positioned above the support base are one or more support platforms for the profiling comb and the movable tool mounting of these platforms being positioned high enough above the support base for the workpiece to be positioned below them. Said support platform or platforms will typically have a flat surface or surfaces extending in planes parallel to the plane of the support base.

In some embodiments the sample support comprises a plate having a straight edge against which its sample to be profiled can be positioned, the plate being movable towards and away from the profiling comb and the straight edge being angularly adjustable to accommodate samples of different shapes. In some embodiments the profiling comb lies flat on the same support platform as the sample support. The sample holder may be held in position by three or more pins projecting upwardly through apertures in the sides of the comb.

In some embodiments of the invention the support platform on which the sample support is mounted has a shallow recess, suitably of rectangular shape, with straight edges against which a bottom edge of the sample can bear, to hold it in the correct position while a profile is being formed by the comb. The recess may also have one or more edges at different angles, which may correspond to desired spring angles such as 45°, relative to the longitudinal direction of a workpiece when supported in the workpiece support.

BRIEF DESCRIPTION OF THE DRAWINGS

Preferred embodiments of the invention will now be described with reference to the accompanying drawings wherein.

DETAILED DESCRIPTION OF THE PREFERRED EMBODIMENTS

Figure 1:
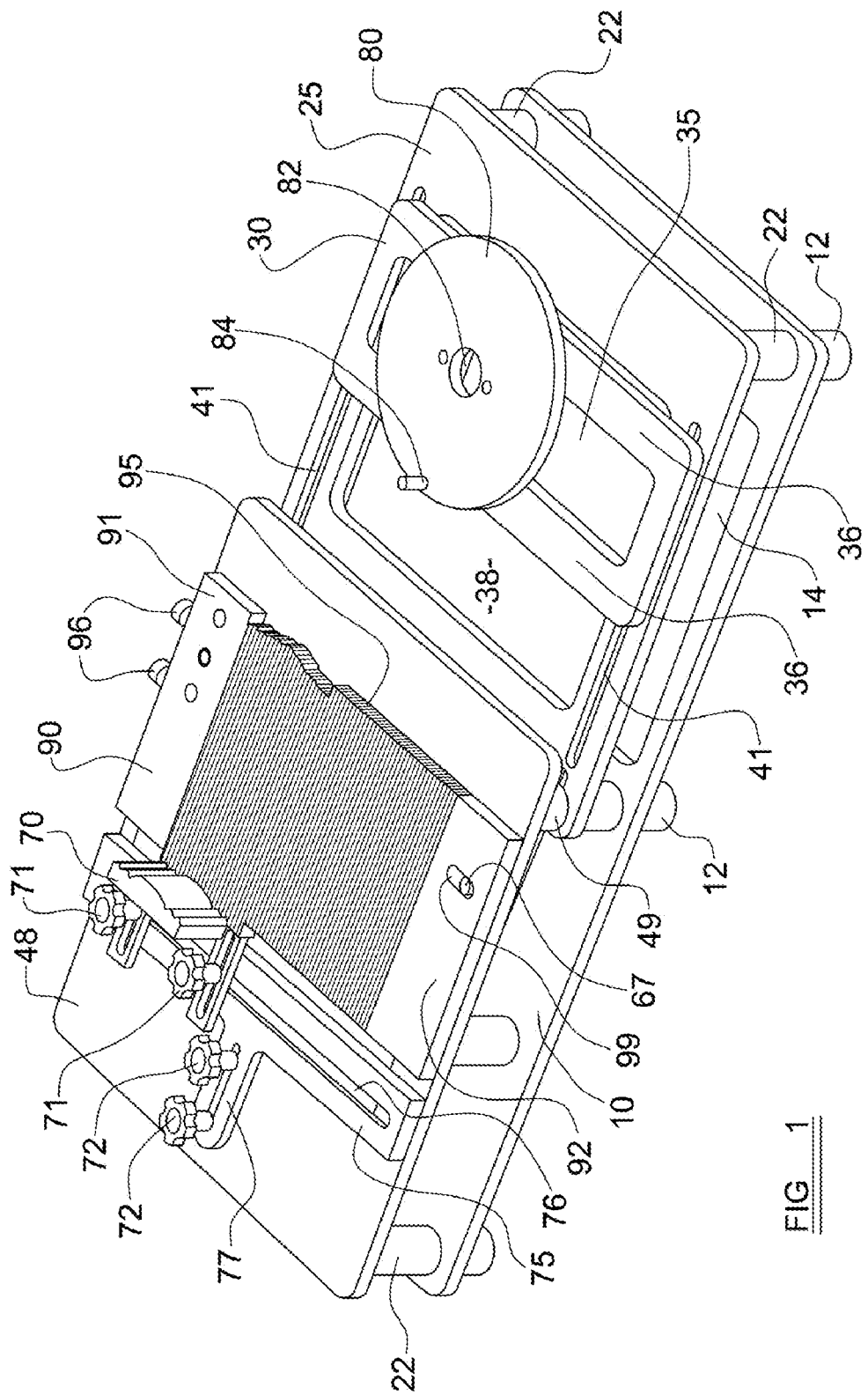
FIG. 1 is a perspective view from one side and one end of a router jig and profiling comb in accordance with a first embodiment of the invention.
Figure 2:
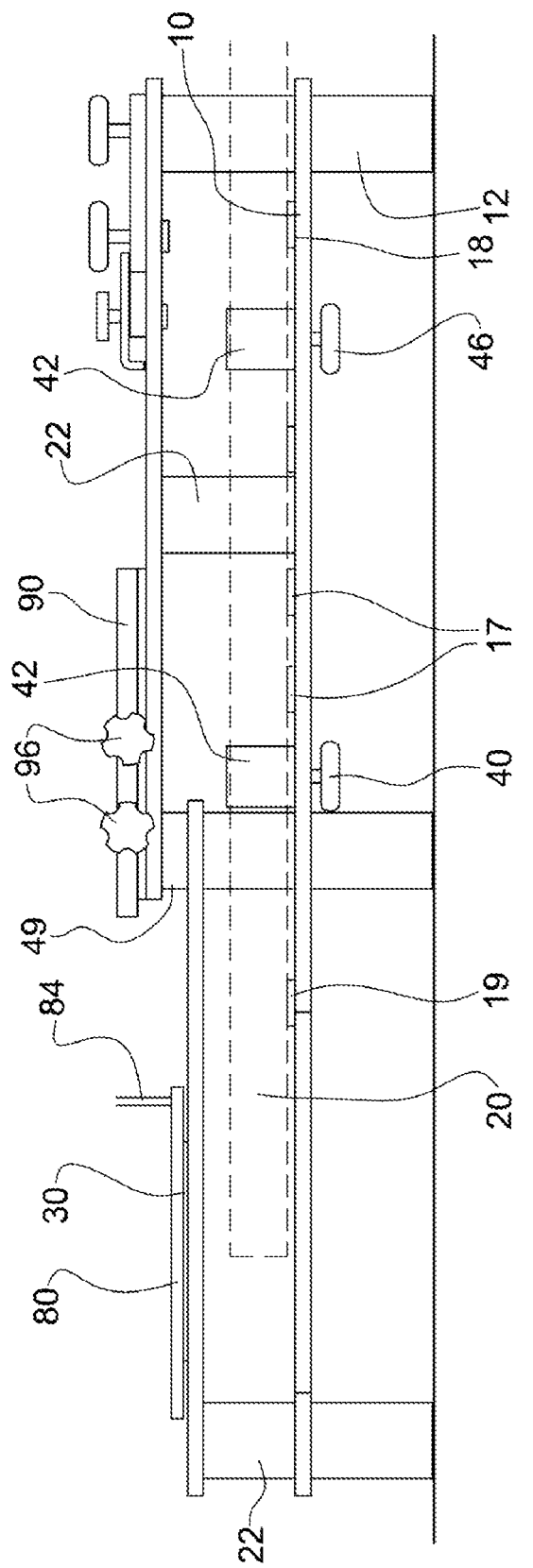
FIG. 2 is a side elevation of the jig of FIG. 1, from the opposite side to that shown in FIG. 3.
Figure 3:
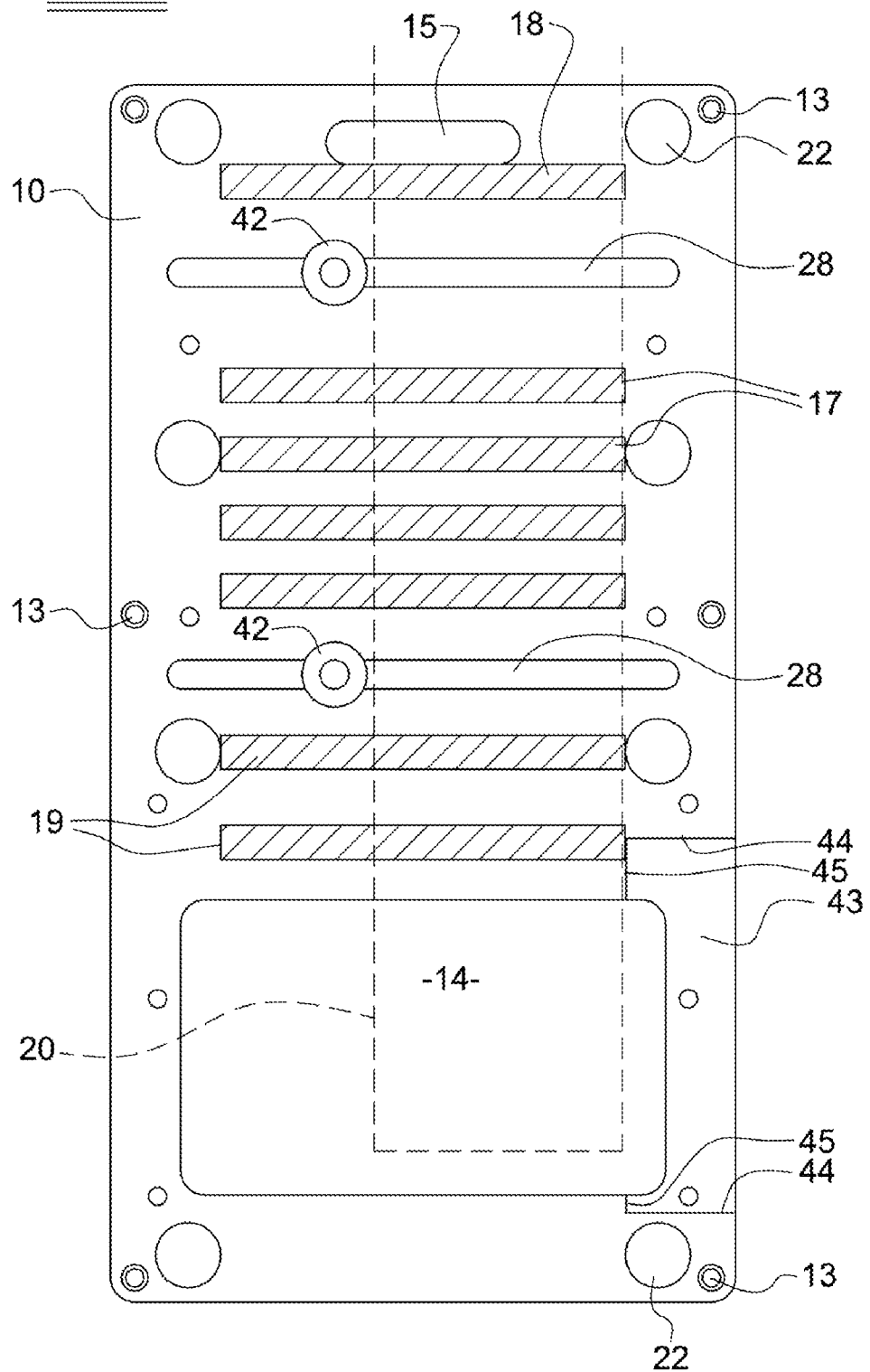
FIG. 3 is a top plan view of the base support of the jig of FIGS. 1 and 2.
Figure 4:
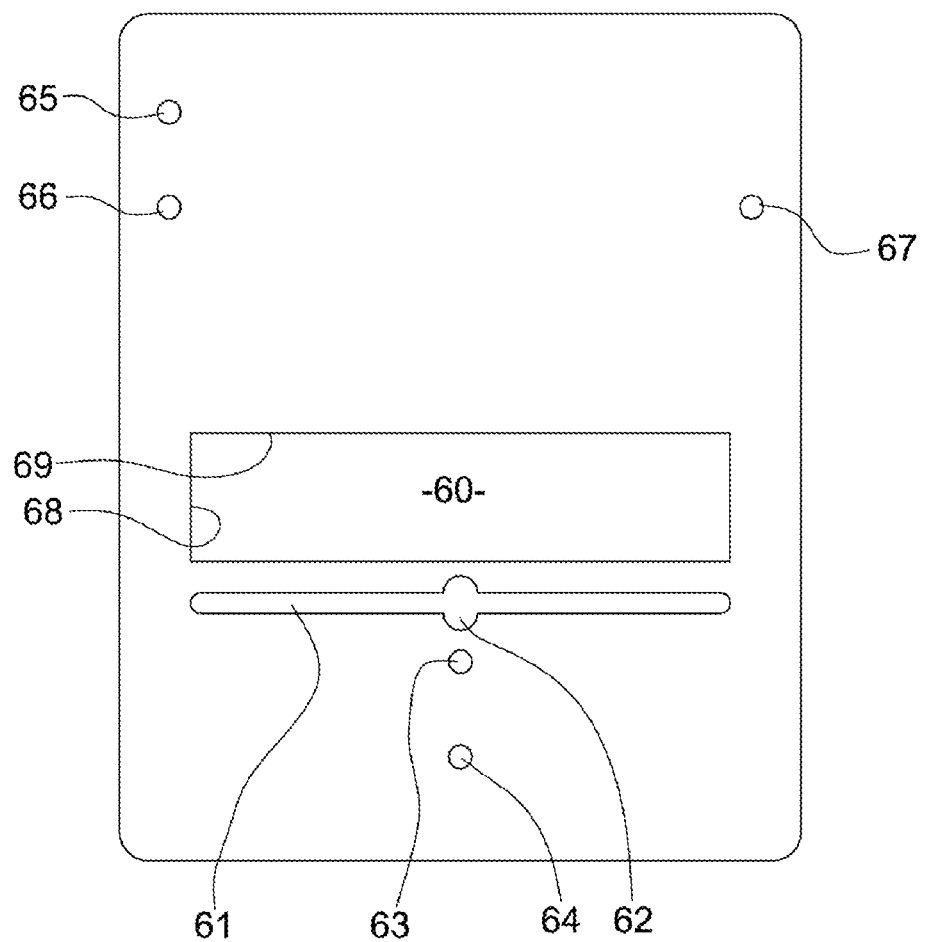
FIG. 4 is a top plan view of the support platform of the sample support and profiling comb of the jig of FIGS. 1 and 2, with the comb and sample support removed.

Referring now to FIGS. 1 to 4, a router jig in accordance with the invention comprises a base support 10, mounted on detachable feet 12, for supporting a workpiece indicated in dotted lines by 20 in FIGS. 2 and 3. This base platform is shown in more detail in FIG. 3 and comprises a rectangular flat base having a substantially rectangular aperture 14 at one end, positioned to allow a router bit to extend through it during a cutting operation. Rubberized strips 17, 18, 19 are provided on the surface of the base support to enable a workpiece to lie flat and to reduce the likelihood of slippage. Positioned at intervals down both sides of the base support are cylindrical pillars 22 to support upper support platforms 25 and 48 as shown in FIG. 1. An aperture 15 at one end of the base support forms a carrying handle. Spaced at intervals between this aperture and the aperture 14 are two parallel elongate slots 26, 28, through which pass the shafts of screw threaded knobs 40 (FIG. 2), connected to cylindrical abutment members 42 above the support base. With the screw threaded knobs 40 loosened, the abutment members can move freely along the slot 26, 28 and can then be locked in position by tightening the knobs 40, to retain a workpiece against lateral movement on the base support. As can be seen in FIG. 4, the abutment members 42 bear against one elongate edge of the workpiece, its opposite elongate edge bearing against the right-hand set of pillars 22 shown in FIG. 3.

The base support 10 may suitably be made of a rigid fibrous or plastics material or a laminated composite, and will typically have a thickness of 5 to 8 mm.

On one side of the aperture 14 is a thinned area 43 of the base support, formed by removing an upper layer of the support to provide abutment edges 44, 45, against which can be positioned a rough piece of wood (not shown) having a flat surface to abut the side edge of the workpiece, to prevent splitting of the grain of the workpiece at the end of a routing operation.

Mounted on pillars 22 above the recess 14 of the base support is a tool support platform 25, extending in a plane parallel to that of the support base and typically space 4 to 6 cm above it. A substantially square aperture 38 in the support platform 25 is located above, and is approximately coextensive with, the aperture 14 in the base support. On each side of the aperture 38 is an elongate running channel 41, these two channels being parallel to one another. A slideable tool support 30 extends across the aperture 38 and has on its underside, adjacent and parallel to each of its shorter edges, a ridge (not shown) located in one of the channels 41 to enable the tool support 36 to slide in the direction of the arrows marked on it.

The tool support 30 is of generally rectangular shape, and is formed with a generally rectangular aperture therethrough, separating a pair of parallel slide surfaces 36 supporting a movable tool mounting 80 of circular or elliptical shape, on which a routing tool can be mounted, with a router bit extending through a central pole 82 and through the apertures 35, 38 and 14 in the tool support 30, the tool support platform 25 and the base support 10 respectively.

Adjacent a forward edge of the tool mounting is an upwardly projecting pin 84, to engage a profile formed by a profiling comb as described below, to guide a router mounted on the tool mounting during a cutting operation.

The tool mounting 80 is slidably mounted on the support slide 30, and can slide between the opposite ends of the support slide, so that a router tool mounted on it can be moved forwards, backwards and sideways and can engage a profiled edge formed by the profiling comb of the invention to follow any desired path during a routing operation.

At the opposite end of the jig the upper support platform 48 for the profiling comb is mounted on pillar 22 above the base platform, slightly higher than the tool support platform 25 and typically 8 to 12 cm above base support and slightly overlapping the tool support platform 25. The end of the platform 48 nearest the tool support platform is supported by pillars 49.

Referring to FIG. 4, the support platform 48 for the comb and the sample holder has a shallow rectangular recess 60 to provide alignment edges 68, 69 for a sample 70 shown in FIG. 1. Adjacent this recess is an elongate slot 61 for side clamps 71 for the sample. The slot 61 has a central enlargement 62, and aligned with it apertures 63 and 64 for clamps 72 securing a sample support 75.

The sample support essentially comprises a flat elongate plate extending the width of the support platform 48, with a central elongate slot 76 through which are support clamps 71 or the sample 70. Each support clamp comprises an elongate slotted clamping member movable relative to the support 75 and a tightening screw extending through the slot in the clamp, a slot 76 in the sample support and the slot 61 in the support platform 48. Loosening the tightening screws enable the clamps 71 to slide towards and away from one another and also to slide transversely to the slot 76.

The sample support also has a central section 77 extending at right angles to the slot 76 in a direction away from the sample. Tightening screws 72 extend through this slot and through respective apertures 63, 64. Loosening these screws enables the sample support to be moved forwards and backwards towards or away from the profiling comb 90.

Figure 5:
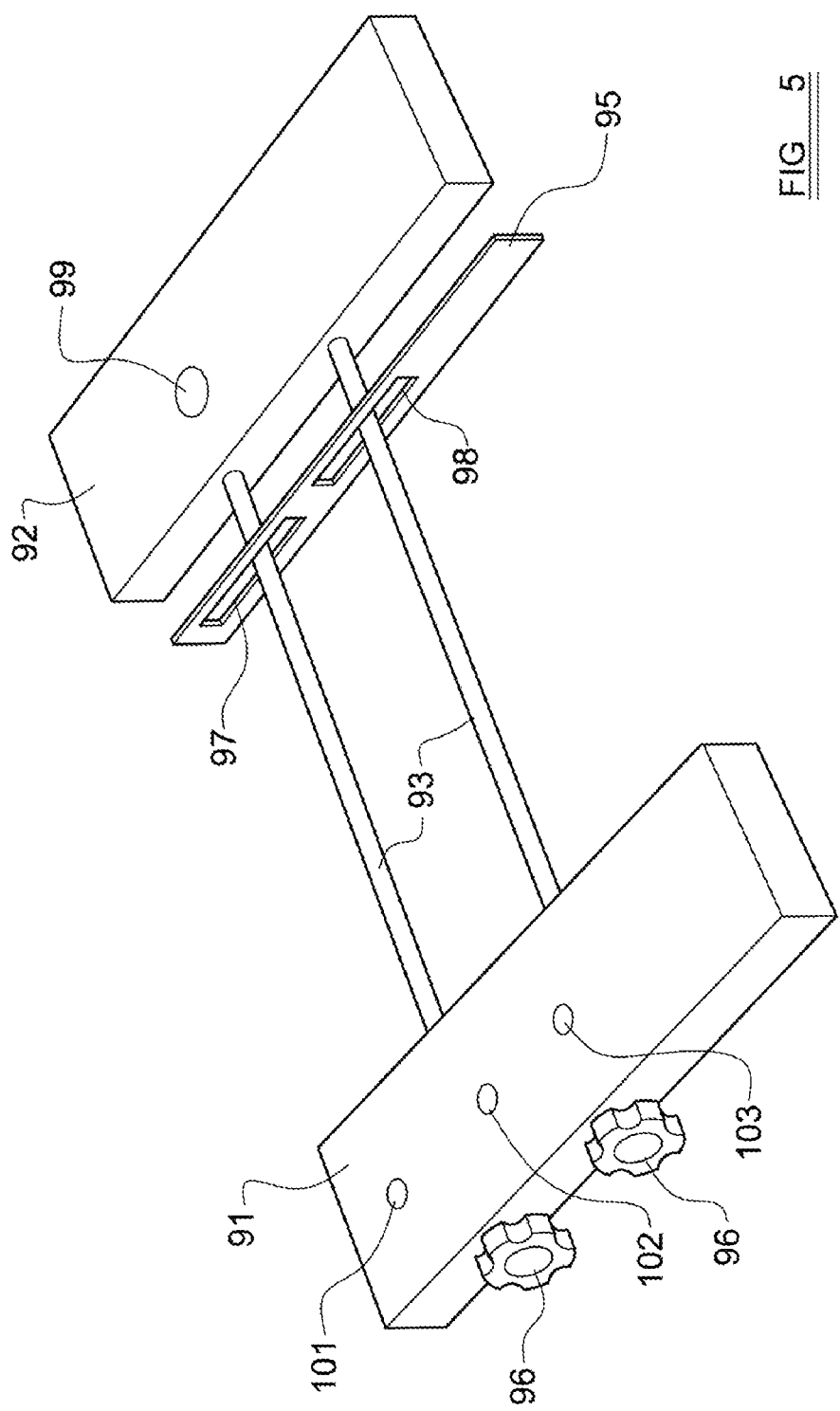
FIG. 5 is a perspective view of the profiling comb of the jig of FIGS. 1 to 4, with all but one of the plates removed.

A profiling comb 90 shown in more detail in FIG. 5, is mounted on the comb support platform 48 between the sample support 75 and the tool support. Referring to FIG. 5, the comb comprises a pair of spaced parallel rectangular blocks 91, 92, connected by a pair of parallel rods 93 on which are mounted a set of parallel flat slotted plates 95 of which, for clarity, only one is shown in FIG. 5. The comb might typically comprise 150 to 300 such plates, each having a thickness of 0.5 to 1 mm.

The rods 93 are fixedly connected at one end to the block 92, their other ends passing right through block 91 and being connected to threaded tightening knobs 96.

Each of the plates 95 has a pair of rectangular slots 97, 98, enabling them to slide independently of one another in a direction perpendicular to the rods 93 and parallel to the blocks 91, 92.

As can be seen in FIG. 1, the plates 95 can together form a profiled surface by pushing them against a shaped sample 70. For this purpose the tightening knobs 96 should be loosened so that the plates 95 can slide relative to one another. Once the desired profile has been formed, tightening of the knobs 96 clamps the plates together, preventing further movement. While mounting the comb in place, locating pins 65, 66 and 67 are provided on the top surface of the comb support platform 48, as shown in FIG. 4. These fit corresponding apertures 99, 101, 102 and 103 formed through the blocks 91, 92. These apertures extend right through both blocks, so that the comb can engage the locating pins either side up. In the position shown in FIG. 1, locating pin 65 engages aperture 101, pin 66 engages aperture 102 and pin 67 engages aperture 99. This latter aperture is made slightly elongate, in a direction parallel to the rods 93, so that the comb can be tightened, drawing the blocks 91, 92 closer to one another while the comb is mounted on the support platform.

The profiling and routing operation using the jig described in FIGS. 1 to 5 is carried out in essentially the same way as in WO2008/029127. A sample 70, which can be a short offcut from the profiled section whose end is to be cut to shape, is stood on its end in the recess 60 of the tool support platform, its flat rear side facing the sample support and its profiled side facing the profiling comb 90. The sample support 75 is moved into contact with the flat surface of the sample, and the clamps 71 are brought into contact with each side of it. The tightening knobs 71, 72 are tightened, so that the sample is held rigidly in position, with its forward edge against the edge 69 of recess 60 and one side edge against the edge 68 of the recess, to prevent movement in any direction.

With the profiling comb in position as in FIG. 1, the plates 95 are pushed towards the sample so that together the plates on one side of the comb form a cam surface reproducing the profile of the sample. The tightening knobs 96 are then fully tightened, drawing the block 92 towards them, the movement being allowed by the elongate shape of the aperture 99 into which locating pin 67 projects.

It will be noted that with the profiling comb lying flat on the platform 48 and engaged by three pins, the comb is prevented by triangulation from any horizontal movement towards or away from the sample, or any twisting movement.

With the profile thus formed, the profiling comb is inverted and placed back on the support platform 48 with the profiled surface facing the tool support. In this position, the pins 66, 67 engage apertures 102 and 99 respectively as before, though from the opposite side of the blocks, while pin 65 engages aperture 103. The profile formed by the plates 95 is thus presented to the pin 84 on the tool mounting 80.

A workpiece 20 is positioned on the base support 10, with one side edge bearing against pillars 22 and the opposite side edge retained locating members 42 which are positioned up against it and tightened. A router is placed on the platform 80 with its bit projecting through the central aperture 82 and the tool is slid towards the profiling comb until the pin 84 engages the ends of plates 95. A routing operation is then carried out, with the router moving laterally across the jig, the pin 84 following the profile formed by the comb, so that the router bit cuts a corresponding shape on the end of the workpiece.

The tool mounting 80 may be tilted very slightly upwards in a direction towards the pin 84, so that the router bit cuts the end of the workpiece at a slight angle, generally less than 5°, ensuring that the profiled front edge of the workpiece neatly engages the corresponding workpiece at right angles with no gaps.

During the routing operation, a rough piece of wood with a flat surface may be placed in the recess 43, with its flat surface up against the edge 45 of the recess and abutting the workpiece, so that the router bit can move smoothly from the workpiece into the piece of wood abutting it, to avoid splitting of the grain at the end of the routing operation.

Figure 6:
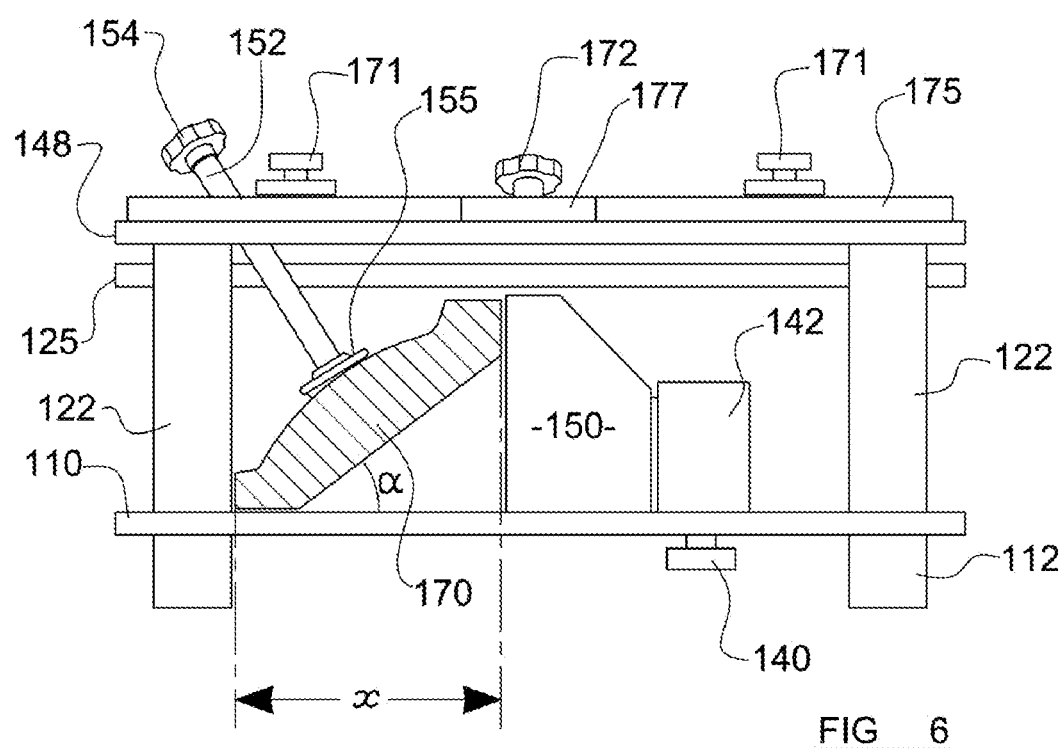
FIG. 6 is an end view of a router jig in accordance with another embodiment of the invention, showing a workpiece in the form of crown moulding in position for cutting a profile.
Figure 7:
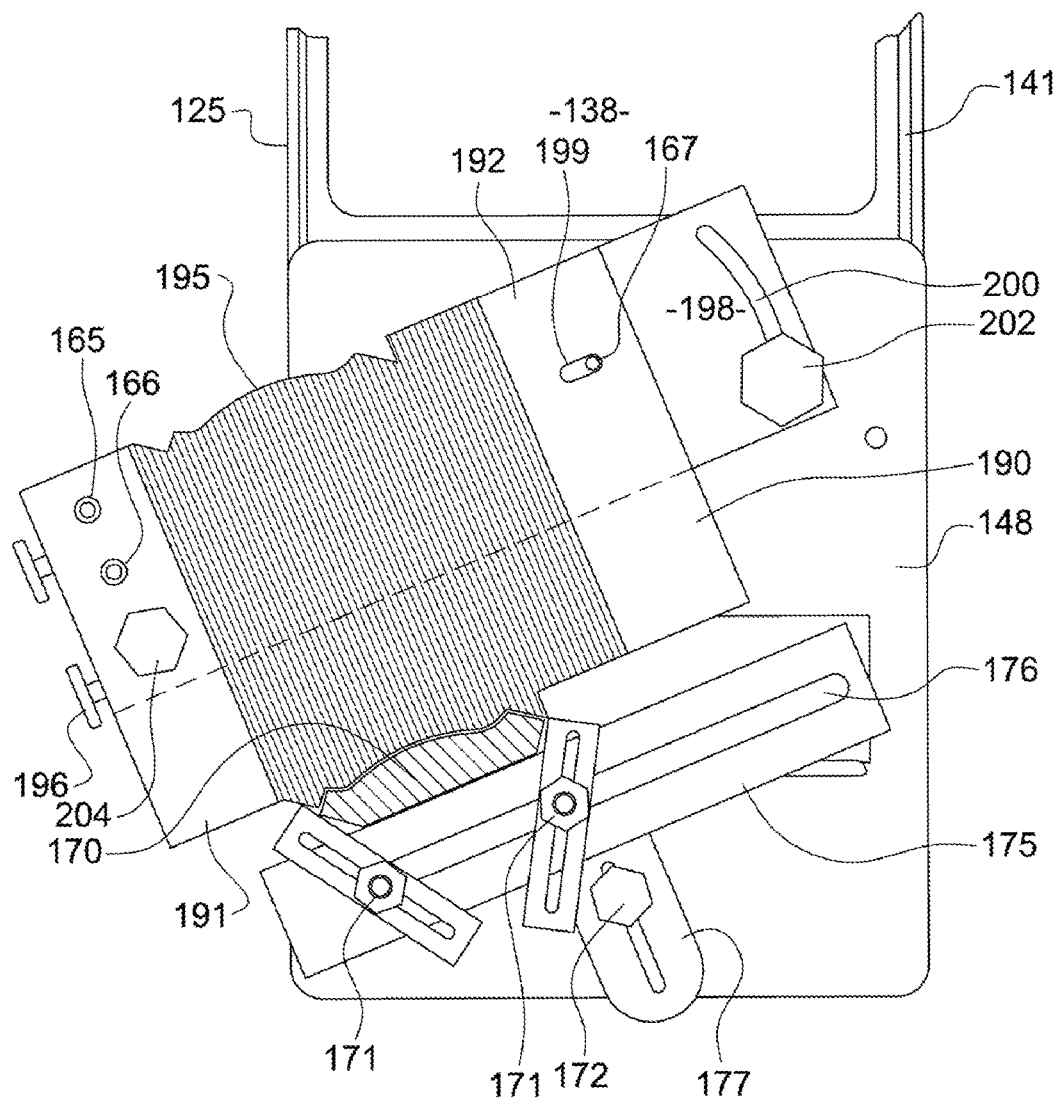
FIG. 7 is a top plan view of the router jig of FIG. 6, showing how a profile can be taken from a sample of a crown moulding.
Figure 8:
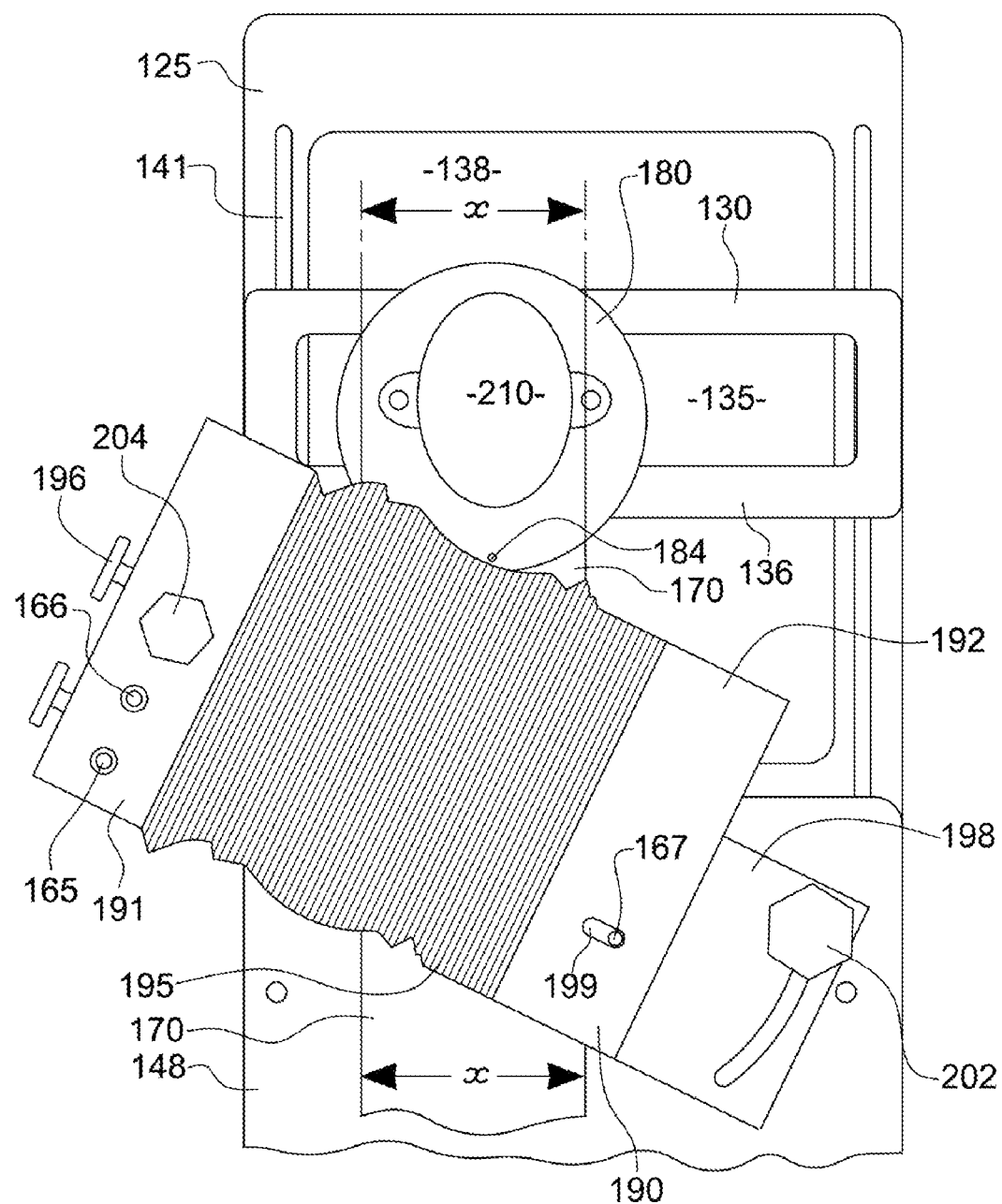
FIG. 8 is a top plan view showing the positioning of the profiling comb for cutting the crown moulding workpiece of FIG. 6.

Turning now to the embodiment of FIGS. 6 to 8, in FIG. 6 a router jig in accordance with a second embodiment of the invention differs from the first in that the sample support platform 148 and tool support platform 125 are positioned higher above the base support 110 in order to accommodate coping or crown mouldings such as 170, which need to be cut at an angle. The basic shape of the jig is otherwise essentially similar to that of the embodiments of FIGS. 1 to 5, with the support platforms 125, 148 supported above the base platform on pillars 122, the pillars on one side supporting a workpiece 170. In this case however the workpiece is a crown moulding of the type used to embellish the join between the wall and the ceiling, and in order to mate with a corresponding moulding in the corner of a room the profiling cut needs to be made with the workpiece set at an angle α to the horizontal as shown in FIG. 6. This angle is known as the spring angle, and corresponds to the angle of tilt at which the moulding sits at the top of the wall. To support the workpiece at this angle, an elongate block 150, having its major vertical surface facing the workpiece, is positioned to support an upper edge of the workpiece so that one edge bears against this block 150 while a bottom edge bears against pillars 122. The block 150 is held in position by a cylindrical retaining member 142, secured in position on the base support by a threaded knob 140. With the workpiece supported at angle α, the opposite edges of the workpiece are specarated by a horizontal distance x.

A screw threaded shaft 152 extends at an angle through the comb support platform 148 and has a bearing member 155 at one end that bears against the workpiece 170 to hold it in position. At its opposite end is a tightening knob 154, turning of which screws the rod 152 towards the workpiece.

The comb support platform 148 also carries a sample support 175 similar to that of the embodiment of FIGS. 1 to 5, with a rearwardly extending central slotted portion 177, tightening knobs 172 and slidable screw clamps 171. As can be seen in FIG. 7 however in accordance with this embodiment of the invention the sample support may need to be turned at an angle to face the profiling comb 190, which is mounted on a rectangular support block 198 which extends across the width of the comb, as indicated by dotted lines in FIG. 7, and extends beyond one side of the comb. This support block has at one end, clear of the comb, an arcuate slot 200 extending therethrough, through which passes a tightening screw 202 securing the block 195 to the platform 148. The locating pin 165, 166 for the profiling comb are in this embodiment provided not on the comb support platform 148 but on the block 195, and the comb can be secured to the block by a screw threaded knob 204 extending through block 191 of the comb.

Threaded knobs 196 are provided on the comb as in the case of the embodiment of FIGS. 1 to 5, to tighten the comb once a profile has been formed.

Because the comb is mounted off centre on the block 198, it will be at an angle when swung into position to face a sample 171, clamped in the sample support 175. This support therefore needs to be set at a corresponding angle. As in the previous embodiment, the sample can be held between clamping members 171, slidable towards and away from one another along a slot 176 in the sample support. In this embodiment the sample support is mounted on a single tightening screw 172, to enable it to swing round to the appropriate angle. A cam surface can thus be formed as in the case of the previous embodiment, by pushing the plates 195 into contact with the sample and then tightening knobs 196 to clamp the plates against further movement relative to one another.

Turning finally to FIG. 8, the profiling comb 190 has again been inverted to face the cutting tool, and the block 198 has been swung round and clamped in the appropriate position to match the required spring angle at which the workpiece is to be cut. Lines may be marked on the comb support to correspond to standard spring angles to enable the comb to be correctly aligned.

The comb is set at an angle relative to the workpiece such that the distance between the ends of the cam surface matching the profile of the sample, and hence of the workpiece 170, are spaced from one another, in a direction of right angles to the longitudinal direction of the workpiece, by the same distance x as separates the opposite edges of the workpiece. Put another way, the workpiece and the effective cam surface each extend between a pair of vertical planes, parallel to one another and to the longitudinal direction of the workpiece and separated by a distance x. If, as will usually be the case, the cam follower pin 184 is directly aligned with the router bit, the two pairs of planes will coincide.

The cutting arrangement is the same as in the embodiment of FIGS. 1 to 5 with a router 210 mounted on a platform 180 arranged to slide onto parallel rungs 136 of a carriage 130, on either side of essential rectangular recess 135 through which the router bit (not shown) can project. The router carriage 130 slides in parallel grooves 141, as in the first embodiment, running on either side of central aperture 138 of the tool support platform 125.

In this way, the profiled end of the workpiece can be cut along a path corresponding to the spring angle at which the crown mouldings are to be mounted so that the profiled end accurately matches the cross section of the profile that it needs, when set at the desired spring angle.

Turning now to the embodiment of FIGS. 9 to 13, a router jig in accordance with a further embodiment of the invention comprises a flat base 300 on which are mounted a sample support platform 302 and a router carriage support platform 304, both extending in planes parallel to that of the base. As in the previous embodiment, the sample support platform is positioned slightly higher than the router support platform and the two overlap in the middle.

Figure 9:
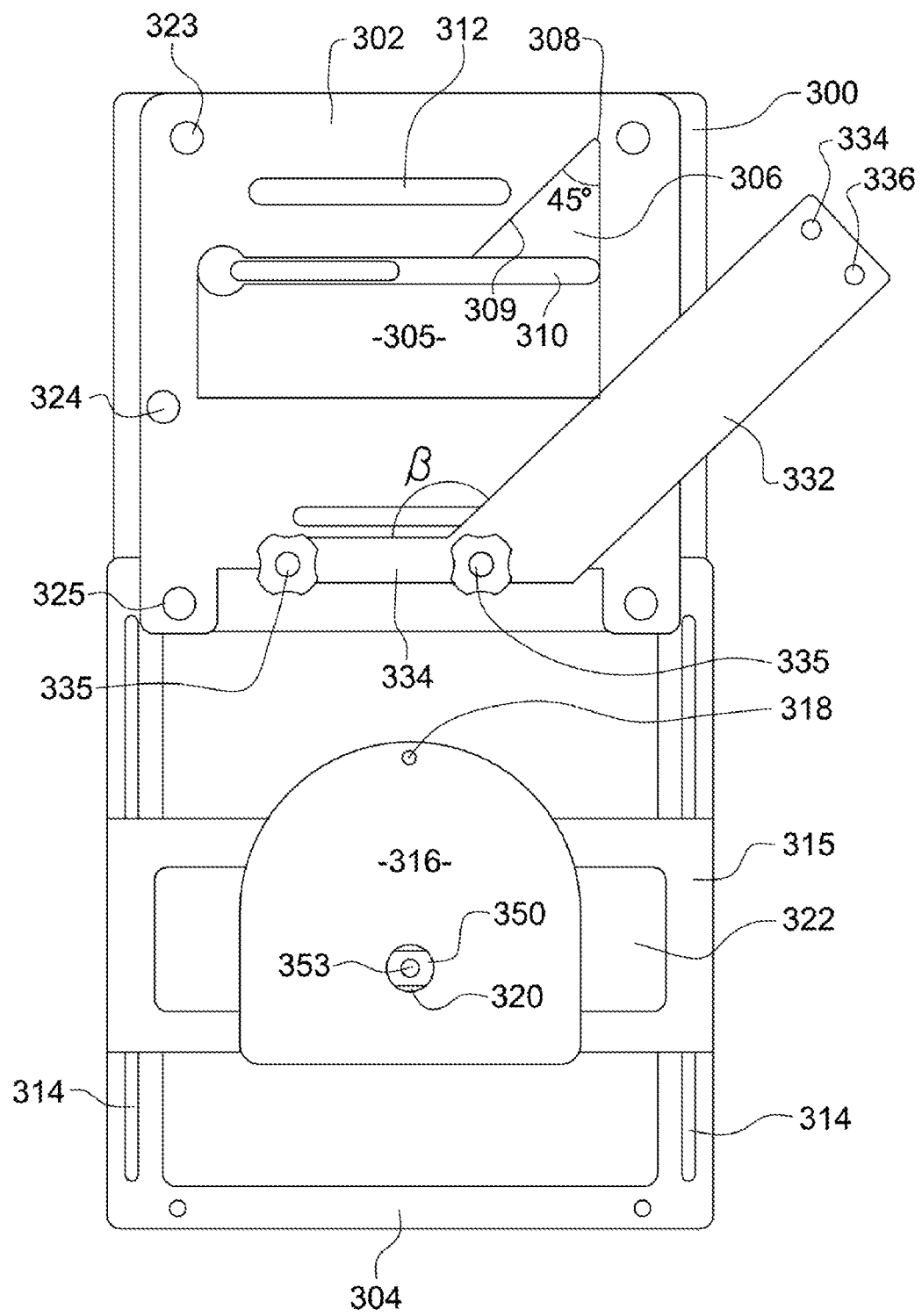
FIG. 9 is a top plan view of a router jig in accordance with a further embodiment of the invention, with the profiling comb removed.

The sample support platform includes a shallow recess 305 with, on one side, a triangular extension 306 which, at the upper end of the jig as seen in FIG. 9, subtends an angle 308 of 45°. This part of the recess thus includes an angled abutment edge 309 against which a sample can be positioned.

Figure 10:
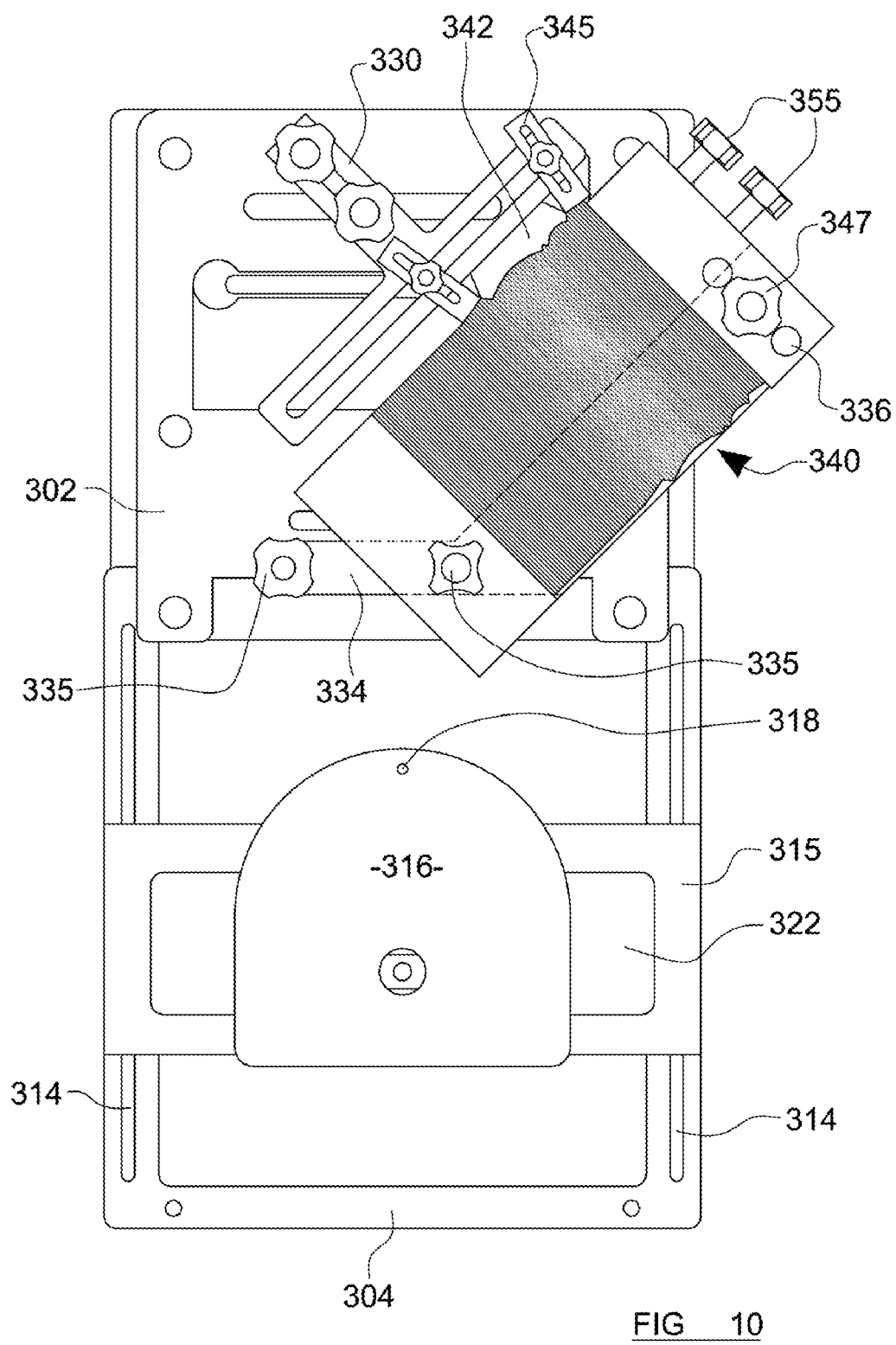
FIG. 10 is a top plan view of the jig of FIG. 9, showing the profiling comb positioned to copy a sample profile.

Slots 310, 312 are provided for locating and locking a sample support 330 as shown in FIG. 10, the configuration and functioning of this sample support being essentially the same as those of the other embodiments.

As in the two embodiments described above, the jig has a router carriage 316 mounted for two dimensional movement, specifically lateral movement on a slide 315 having an aperture 322 and back and forth movement of the slide 315 in slots 314 of the router support platform 304. The router carriage has a central aperture 320 through which a router bit can project downwards, and a cam-following pin 318. As will be described in more detail below, the router carriage of this embodiment carries on its underside a bracket 350, best seen in FIGS. 12 and 13, extending below the bit aperture 320 and having a bearing aperture 352 to receive the end of a router bit and hold it against 'whip' movement.

In this embodiment, instead of the pivotable comb mounting 198 of the embodiment of FIGS. 6 to 8, a rigid support 332 is provided, suitably of steel, aluminium or rigid plastics material and comprises a support plate 332 and an anchoring leg 334 which between them subtend an obtuse angle β which may suitably be 135°, for reasons which will be made clear below. The support plate has an upwardly projecting peg 336 and a bore 334 for locating and anchoring a profiling comb as in the case of the embodiment of FIGS. 6 to 8. The comb support is in the form of a flat plate, and lies flat on the sample support platform 302, being secured by a pair of screw knobs 335.

As shown in FIG. 10, a profiling comb similar to that of FIGS. 7 and 8 is mounted on the comb support and secured by threaded knobs 335, 347 with peg 336 projecting through another bore in the comb to provide triangulated support against twisting. In this position, with the plates of the comb loosened by means of threaded knobs 355, a profile can be taken of a sample section 342 of a coving, held between clamps 345 of sample support 330, the knobs 355 then being tightened to form a cam surface as in the previously described embodiments. In this embodiment, the sample 342 rests in the shallow recess 306, with its rear surface against the 45° edge 309 of the recess. The recess 305 may suitably have a depth of 1.5 to 2.5 mm.

Figure 11:
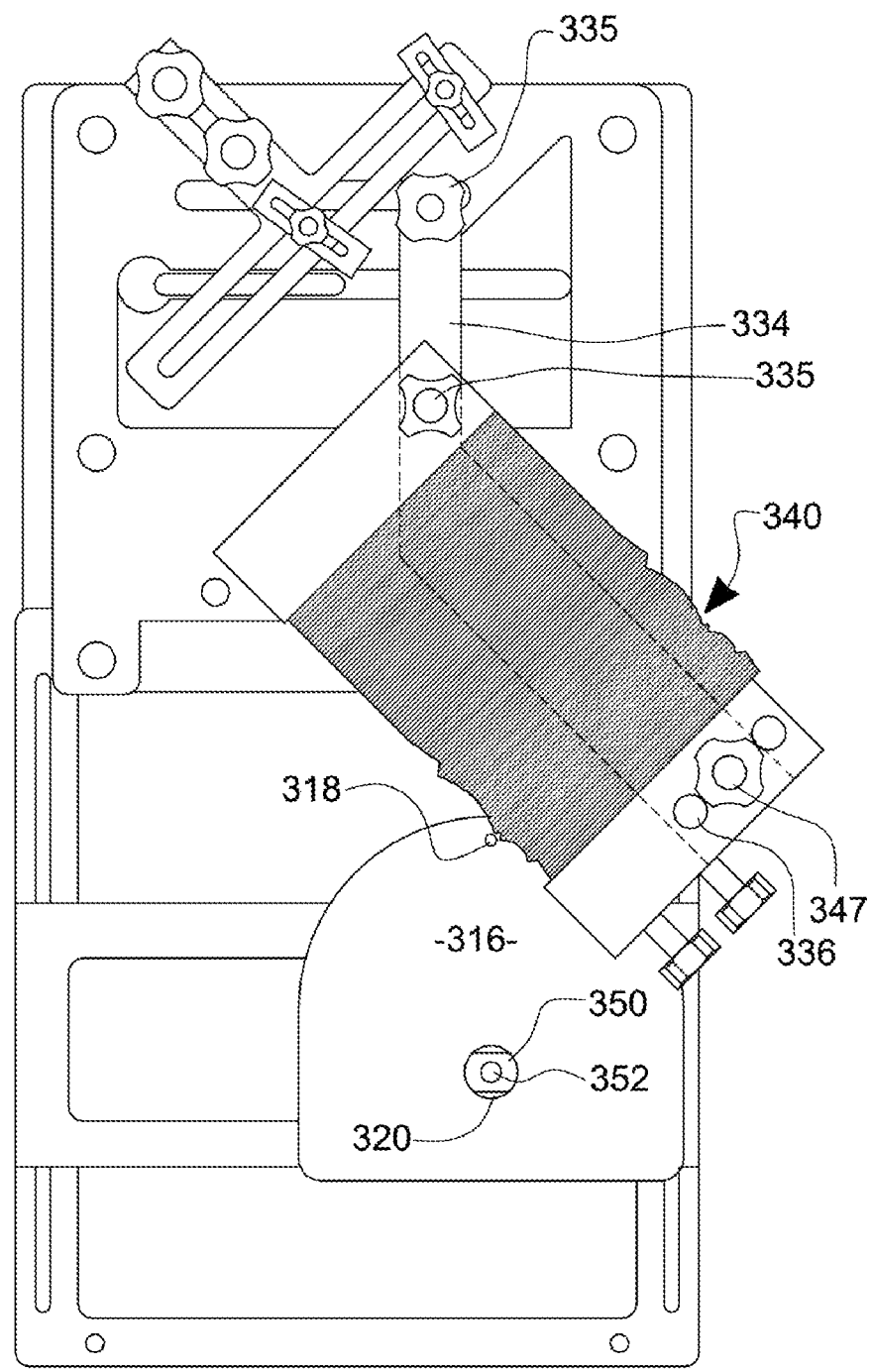
FIG. 11 is a top plan view of the jig of FIG. 9 showing the profiling comb repositioned for routing.

Referring now to FIG. 11, the comb support has been rotated through 90° about a vertical axis, from the position shown in FIG. 9 in which the anchor plate 334 extends laterally across the jig, to a position in which this support extends longitudinally of the jig, and the profiling comb 334 has been inverted on the support plate 332 so that the profile formed from the sample 342 is positioned to engage the cam follower pin 318 of the router carriage 316 for a routing operation.

In this position, the profiling comb is held by its support 340 at a 45° angle to the longitudinal direction of the jig and of the workpiece to be cut.

Figure 12:
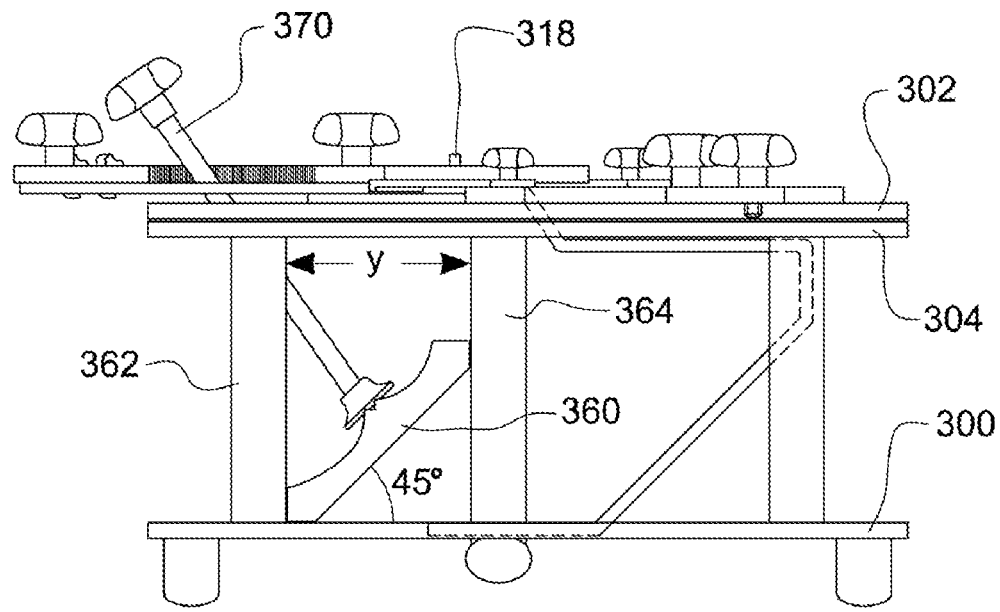
FIG. 12 is an elevation of the router from the end shown at the top in FIG. 9.
Figure 13:
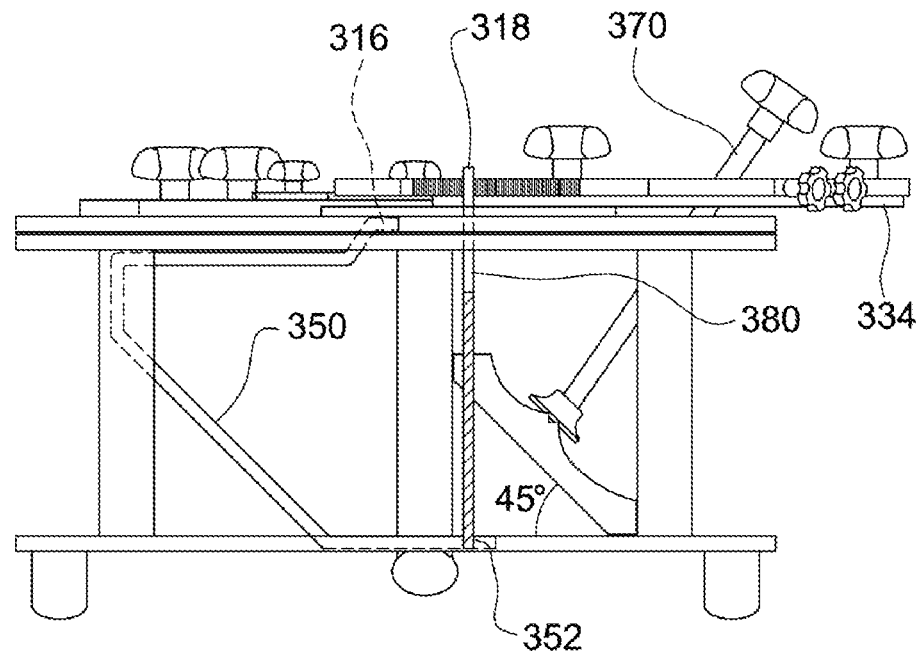
FIG. 13 is an elevation of the router from the end shown at the bottom in FIG. 9

Referring now to FIGS. 12 and 13, an elongate workpiece 360, shown in end section, is supported between two pillars 362, 364 on the jig base 300, with its rear surface forming a 45° angle to the horizontal. This angle may be varied according to the desired spring angle, but the pillars 362, 364 may conveniently be spaced at a distance y such that covings of a standard size extending between them rest at a 45° angle. The workpiece is held in position by a diagonal screw-threaded rod 370 as in the embodiment of FIGS. 6 to 8. The spacing y will in this case also represent the lateral distance between the ends of the cam surface formed by the profiling comb. Means may also be provided for supporting the comb and the workpiece at different angles, for example an adjustable angle bracket or a set of supports for the workpiece having support surfaces at different angles.

FIGS. 12 and 13 also show the bracket 350, which is a bent strip of metal having one end secured to the underside of router carriage 316 and a lower end, having the bearing hole 352, below the aperture 320 to receive an end of a router bit shown as 380 in FIG. 3. Though the router itself is omitted from these drawings for clarity, it can be seen from FIG. 13 that a router will be mounted on carriage 316 with its bit projecting downwardly into the bearing hole 352 so as to be held at both ends during routing, to keep it steady and avoid any 'whip' effect.

The routers of any of the above described embodiments can be adapted for simpler drilling or routing operations by removing the router carriage 80, 180, 316 and replacing the slide 30, 130, 315 with a slide of similar size but with a narrower transverse slit for direct mounting of a router, so that routing of a workpiece on the base platform can be carried out in two dimensions.

Figure 14:
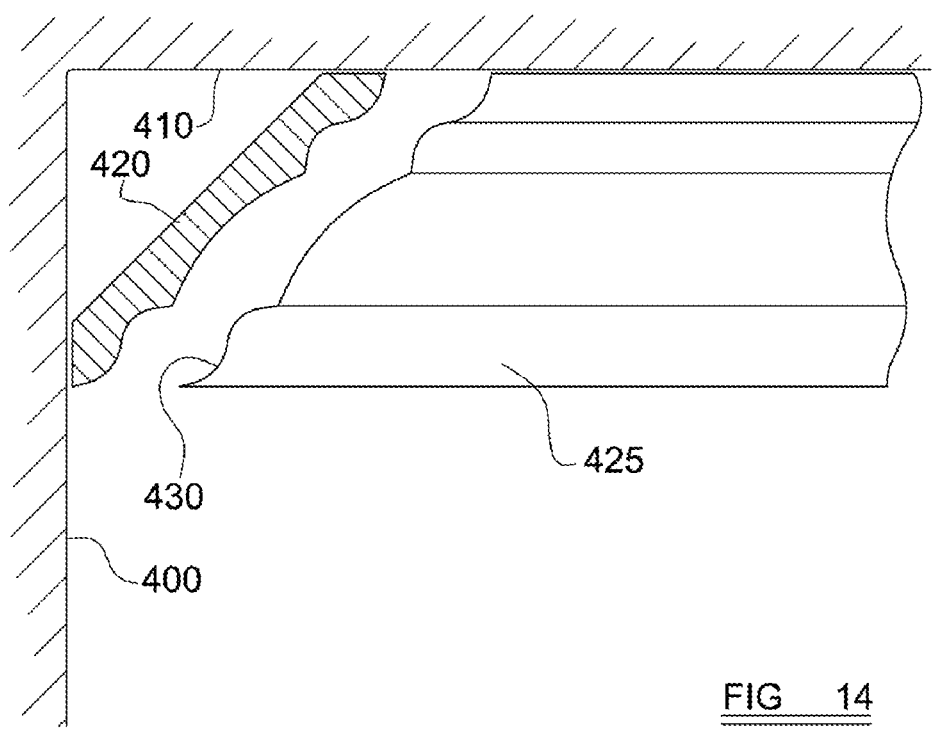
FIG. 14 illustrates how two crown moulding sections fit together, the end of one section having been cut to match the surface profile of the other using a jig in accordance with the invention.

Referring finally to FIG. 14, a coving section 420 is mounted at a 45° spring angle across the junction of a wall 400 and ceiling 410. A section coving section 425, is arranged at right angles to the first, its end having been cut to match the surface profile of section 420. When the section 425 is slid to the left, it will engage the first section without leaving any gaps.

What is claimed:

1. A router jig for profiling the end of an elongate workpiece to match a desired shape, said jig comprising:
   a support for a sample, having a surface profile to be copied;
   a profiling comb in the form of an array of parallel plates held in contact with one another by retaining means extending between a pair of support blocks, each said plate being individually and reversibly slidable in one direction relative to the others and having a contact surface at one end thereof whereby the contact surfaces of adjacent plates can be pushed against a sample in said support to define a cam surface corresponding to the profile to be copied means being provided for clamping the plates of the profiling comb together, preventing further said sliding movement,
   a movable tool mounting on which a cutting tool can be mounted and moved to follow a path defined by said cam surface to cut an end of the workpiece to match the shape of said cam surface, and
   a workpiece support arranged to hold said workpiece with one end in the path of a cutting tool mounted on said movable mounting,
   wherein the profiling comb is mounted on a flat base which is longer and narrower than the comb and thus extends beyond the comb on at least one side, the base being pivotally movable on a support platform, about a vertical axis spaced from the profiling comb in a direction to one side of it, and wherein the profiling comb is invertible on said base between a first position in which it faces the sample support and a second position in which it can engage said cutting tool mounting, at an adjustable angle to vary the direction of a cut relative to a workpiece being cut,
   wherein said profiling comb, when in said second position, is fixed on said flat base at an acute angle to a longitudinal direction of the workpiece and
   wherein the workpiece support is configured to support and retain a workpiece at an acute angle about its longitudinal axis corresponding to said acute angle at which said profiling comb is fixed.

2. A router jig according to claim 1 wherein the profiling comb is mounted adjustably on the jig so that in said first position the relative angular positions of the comb and the sample support can be varied through at least 60° and in said second position the relative angular positions of the comb and the longitudinal direction of the workpiece support can be varied through at least 45°.

3. A router jig according to claim 1 wherein the profiling comb is mounted on a support plate that is movable between a first position on said jig in which it supports the comb in the first position of the comb at a predetermined angle relative to the jig and a second position on the jig in which it supports the comb in its respective second position at a predetermined angle relative to the workpiece support.

4. A router jig according to claim 1 wherein said sample support comprises at least one abutment surface configured to support a workpiece at a desired angle, and clamping means to hold a workpiece against said abutment surface.

5. A router jig according to claim 4 wherein said clamping means comprises a screw-threaded shaft mounted in said jig for axial movement in a diagonal direction towards and away from said workpiece.

6. A profiling comb according to claim 1, wherein each of said plates has an elongate slot therein and wherein said retaining means comprises at least two rods passing through the slots in the plates and connecting said support blocks together, at least one said block being movable towards and away from the other by sliding on said rods, said means for clamping the plates being configured to tighten said blocks against the plates to lock them against said relative movement and thus retain a profile formed thereby.

7. A router jig according to claim 1
   wherein in each of said first and second positions of said profiling comb one of said support blocks of the comb positively engages the said flat base in at least two positions while the other support block positively engages the base in at least one position, to give a triangulated lock against twisting movement of the comb.

* * * * *